United States Patent [19]

Eachus

[11] 4,002,833
[45] Jan. 11, 1977

[54] RATE INDEPENDENT SIGNALLING MEANS
[75] Inventor: Joseph J. Eachus, Cambridge, Mass.
[73] Assignee: Honeywell Information Systems Inc., Waltham, Mass.
[22] Filed: Dec. 20, 1974
[21] Appl. No.: 534,972
[52] U.S. Cl. .............................. 178/66 R; 325/30; 325/38 A; 325/40; 325/44; 178/DIG. 3
[51] Int. Cl.² ....................................... H04L 27/00
[58] Field of Search .......... 178/66, 67, 68, DIG. 3; 325/30, 40, 47, 38 A, 44, 38 R; 328/62

[56] References Cited
UNITED STATES PATENTS

| 3,614,620 | 10/1971 | David | 178/66 R |
| 3,634,855 | 1/1972 | Miller | 325/38 A |
| 3,808,366 | 4/1974 | Wanamaker et al. | 325/38 R |

Primary Examiner—Robert L. Griffin
Assistant Examiner—Michael A. Masinick
Attorney, Agent, or Firm—William F. White; Ronald T. Reiling

[57] ABSTRACT

A method is disclosed wherein information can be conveyed serially over a signal path in a rate-independent fashion. Three or more signal states are employed for conveying information. The disclosed method consists of attaching meanings to changes of signalling state rather than the length of time that a state is maintained. It is only required that the data source and data sink establish meanings for each change of state and that each transmitted state be maintained long enough for the receiver to detect it.

11 Claims, 6 Drawing Figures

RATE INDEPENDENT SIGNALLING MEANS

BACKGROUND OF THE INVENTION

1. Field of the Invention

This invention relates generally to the serial transfer of data from a source to a data sink, and more particularly to a means for the serial transfer of data in a rate-independent fashion.

2. Description of the Prior Art

Means for the serial transfer of data in a rate-dependent fashion are well-known in the art. All of these rare-dependent means are characterized by the fact that the data receptor must be aware of the rate at which the data dispatcher is transferring data. The receptor uses the element of time to discriminate between different pieces of information signaled by the data dispatcher.

Typical of rate-dependent signalling means are exemplified by DC signalling and AC transmission as described in Chapters 6, 7 and 8 in a text entitled "Telecommunications and the Computer" by James Martin (Prentice-Hall, Englewood Cliffs, N.J., 1969). In DC signalling, data is transferred by two logic levels, generally referred to as marks and spaces. The marks and spaces are coded to represent letters and digits. A code for letters and numbers might be designed with five bits of information (a mark or a space being a bit) representing a letter or number. The element of time and rate-dependence enters into DC signalling when it is realized that two consecutive bits of information having the same value (say mark bits) will have the same logic level (say high logic value, perhaps +5 volts). Thus, to determine that there are two different bits being transferred, a time frame is defined in which the value of the data dispatcher's signal is sampled. In the case of two marks, then the two consecutive samplings by the data receptor would both detect high logic levels. By introducing the time frame element, rate dependence of the signalling means is introduced. This is because a receptor's sampling frequency, say 1000 samples/second, clearly dictates that for proper reception of the data that it must be dispatched at the same rate, in this case 1000 bits of information/second.

In DC signalling, the fact that the data dispatcher and data receptor will not have exactly the same rate because of impreciseness of physical components is accommodated to a small degree by ending coded characters (of say 5 bits) by a Stop Bit. Also, a Start Bit, which is usually a space, denotes the beginning of a character and signals the receptor to sample the desired number of bits. The Stop Bit is usually a mark. The Stop Bit is somewhat longer in time and by following the coded character, allows the data receptor to detect the end of the character even if the receptor's sampling has been lagging in the time frame. The Stop Bit is typically 1.5 times the duration of marks and spaces in the coded-character.

AC signalling is an extension of the principles of DC signalling. AC signalling involves the modulating of the DC marks and spaces for long-distance signal transmission and then the demodulation of those signals back into marks and spaces at the receiving end. Frequency-shift keying is a frequently employed AC signalling technique.

There is needed a signalling means which a data dispatcher can adjust the data transfer rate without prior notification to the receptor.

SUMMARY OF THE INVENTION

The invention herein disclosed comprises a method for serially conveying in a rate-independent fashion at least two different types of discrete units of information from a data source to a data sink over a signal path by means of signal state changes among three or more signal states. The method comprises the changing of signal states in a predetermined manner to represent each different discrete unit of information and also an interpreting of the changes of signal states as corresponding to the appropriate discrete unit of information. The signal states employed will be referred to infra as "state A," "state B", "state C", and so on. The term "signal state" refers to a logic level in a D.C. signal and a frequency level in an A.C. signal.

Fundamentally, the method consists of attaching meanings to changes of signalling state rather than to the length of time that a state is maintained. The meanings of state-changes may be made to correspond to, for example, signal levels in the mark state or space state of DC signalling or a more complex correspondence may be established. The simplest of all is to use three states, and have changes from A to B, from B to C and C to A all correspond to "space" for one unit time, and changes from A to C, B to A, and C to B each correspond to "mark" for one unit time. This is clearly adequate to represent the mark-space sequences used for a DC or AC signalling operation, if "unit time" is interpreted as one DC or AC signalling bit time.

By building apparatus which dispatch and receive data according to conventions established for the meaning of the changes of these signalling states, the receiving apparatus accommodates changes in signalling rate, includng abrupt changes, without attention or adjustment. It is only required that each transmitted state be maintained long enough for the receiver to detect it.

OBJECTS OF THE INVENTION

It is an object, therefore, of the instant invention to provide an improved method for the serial transfer of data from a data source to a data sink.

It is another object of the invention to provide a method for the serial transfer of data from a data source to a data sink in a rate-independent fashion.

It is still another object of the invention to provide a method for the serial transfer of data from a data source to a data sink which can accommodate sudden changes in the transfer rate of the data dispatcher or data receptor.

It is still another object of the invention to provide an improved apparatus for the serial transfer of data from a data source to a data sink.

Still another object of the invention is to provide an improved data dispatcher for the serial sending of data from a data source to a data sink.

A further object of the invention is to provide an improved data receptor for the serial receiving of data by a data sink from a data source.

Other objects and advantages of the invention will become apparent from the following description of a preferred embodiment of the invention when used in conjunction with the drawings contained herewith.

DESCRIPTION OF THE PREFERRED EMBODIMENT

General

Figure 1:
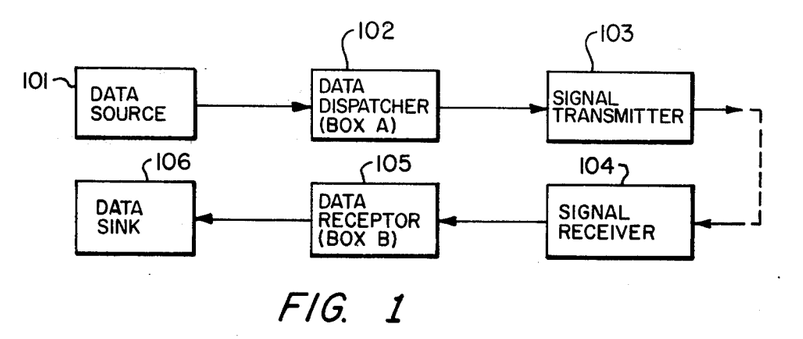
FIG. 1 is an overall block diagram of a system employing the invention.

Without limiting the invention, and in order to obtain a better appreciation of the invention, it will first be described with one environment for performing one task. FIG. 1 shows a system with apparatus for conveying data from a data source to a data sink over a signal path in a rate-independent fashion. In this example, the subject apparatus is intended for use in conjunction with a signal transmitter 103 and a signal receiver 104. The subject apparatus is in two disjunct parts as follows:

a. A data dispatcher 102, referred to infra as box A, which will intervene between the data source 101 and the signal transmitter 103, and b. A data receptor 105, referred to infra as box B, which will intervene between the signal receiver 104 and the data sink 106. It is necessary to endow the data source 101 with certain capabilities in order that it relate effectively with box A 102. These are:

1. The ability to sense the state of a status flip-flop S, which is a part of box A, and to set that flip-flop to the "one" state when appropriate.
2. The ability to load a shift register R, which is a part of box A, with data to be sent.
3. The ability to set the contents of a counter C, which is a part of box A, to some value $n$.
4. The ability to interpret the "one" state of S as a device busy indication, and the "zero" state of S as a device available indication.

The normal actions of the data source with respect to box A are: When source has $n$ bits to be sent and $S = 0$, load the $n$ bits into R, set C to $n$, and then set S to one; do nothing further to affect box A until box A itself resets S to zero.

It is necessary to endow the data sink 106 with certain capabilities in order that it relate effectively with box B 105. These are:

1. The ability to sense the state of a status flip-flop S, which is a part of box B, and to set that flip-flop to the "one" state when appropriate.
2. The ability to read received data from a shift-register R, which is a part of box B.
3. The ability to interpret the "one" state of S as a device busy indication, and the "zero" state of S as a data available indication.

It may be useful to the data sink, although not necessary to the functioning of box B, to endow the data sink with the capability of reading the contents of a counter C, which is a part of box B. In this case, the same data sink action that sets S to one should also reset the contents of C to zero. There is no loss if it is made a property of box B that the S-setting signal from the data sink also resets C.

The normal actions of the data sink with respect to box B are: When S is zero, read received data from R. If by prior agreement between data source and data sink $n$ does not always have the same value, or if $n$ is useful to the data sink for error detecting purposes, read also the contents of C. When the read data has been assimilated, set S to one.

It is necessary to endow the signal transmitter 103 and signal receiver 104 — that is, the communications system — with certain properties for it to serve as the coupling between box A and box B. These properties are:

1. The input to the signal transmitter is two parallel DC logic level signals, which will be supplied by box A.
2. The output from the signal receiver is two parallel logical level signals, which will be sensed by box B.
3. The receiver output should be a faithful copy of the transmitter input, displaced in time by propagation delay. So long as the input remains in steady state, so also should the output, with no significant difference in propagation delay for the two signals. Two channels from almost any multiplex communications system, for example, meet these requirements, as does also a pair of parallel wires.

It is the function of box A 102 to accept data bits and a binary number $n$ from the data source 101 and to translate this information into a sequence of changes of state of two output flip-flops X and Y.

Briefly stated, the actions of box A are to examine each data bit in turn, and if the tested bit is one, reverse X, but if the tested bit is zero, reverse Y; after $n$ data bits have been so processed, reverse both X and Y, and signal completion to the data source.

Figure 2:
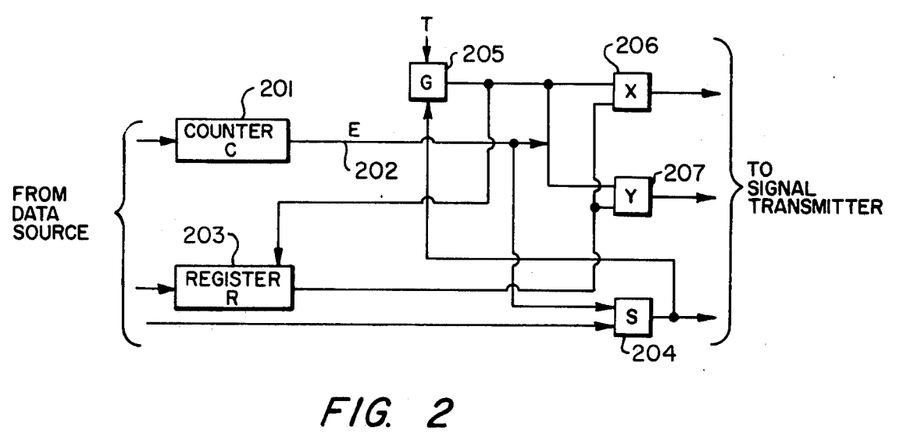
FIG. 2 is a block diagram of an embodiment of a data dispatcher, which will intervene between the data source and a signal transmitter, to transfer data serially in a rate-independent fashion.

One implementation of box A, as shown in FIG. 2, has within it:

1. A binary counter C 201, which is set to some value $n$ by data source action, and which counts down as box A operates.
2. A DC logic level signal E 202, which has the value zero if the contents of the counter C 201 is zero, and has the value one if the contents of C is not zero.
3. A data register R 203, which is loaded in parallel by data source action, and which is shifted as box A operates. A part of the internal logic of box A senses the value of the data bit in the end position of R.
4. A status flip-flop S 204, which is set to one by data source action, and which is reset to zero by box A itself.
5. A "go" flip-flop G 205, which is set to one if $S = 1$ and a change state signal T changes from zero to one. G is reset to zero by T becoming zero.
6. A pair of toggle flip-flops X 206 and Y 207, which are at times reversed by box A internal logic, and whose output serves as input to the signal transmitter.

The normal state of box A when it is waiting to be activated by the data source is with $S = 0$ and $G = 0$. While box A is in this state, the data source is free to load data into R, and to set C to $n$. The data source determines that this condition exists by sensing S only, since it will be seen from the box A operating rules that $S = 0$ implies $G = 0$. The data source is constrained from taking any action affecting box A as long as $S = 1$.

When the data source has loaded R and set C, it enables box A action by setting S to one. Thereafter, the first event to occur is that G will be set to one by T. Box A action rules are:
1. When G becomes one and the content of C is not zero, and $R_o$ (the end bit of the shift register R) is one, reverse X, shift R, subtract one from C.
2. When G becomes one and the content of C is not zero, and $R_o$ is zero, reverse Y, shift R, subtract one from C.
3. When G becomes one and the content of C is zero-reverse both X and Y, and set S to zero.
4. The DC state T = 0 sets G to zero.

It may be observed that data-dependent actions of box A are changes of X and Y, and that state changes are controlled by the change state signal T, whose rate is independent and unknown to the data sink. Fully and formally stated, the actions of box A are:
1. If S = 1, set G to 1 when T becomes one.
2. While T is zero, hold G at zero.
3. $E = C_o + C_1 + C_2 + \ldots$, where the subscripted C's are the bits of the counter C.
4. Reverse X when the expression $$GR_o + G\overline{E}$$

becomes one.
5. Shift R and count down by one in C when the statement $$\overline{G}E$$

becomes one.
6. Set S to zero when the statement $$\overline{G}E$$

becomes one.

Figure 3:
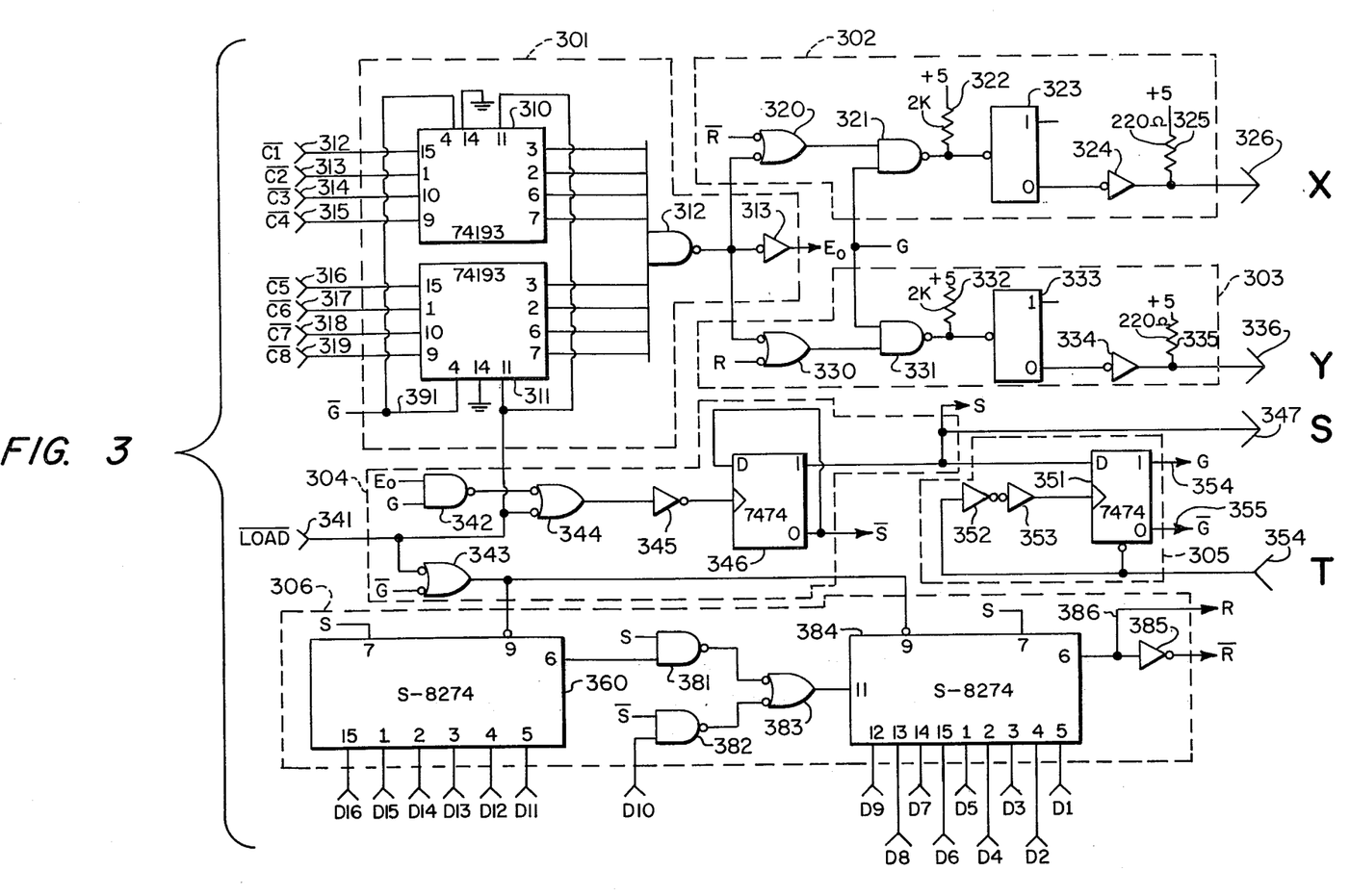
FIG. 3 is a logical diagram of an embodiment of a data dispatcher.

FIG. 3 shows a logical diagram of an A box. The symbolism used herein for logical diagrams is that of MIL-STD-806B, Feb. 26, 1962. For interpretation of symbols not covered by that standard, reference is made to the published literature of the manufacturers of "edge triggered" and other integrated circuits, in particular National Semiconductor, Signetics, and Texas Instruments. For ease of description, the logic circuitry has been divided into six major sections as follows: counter C 301; flip-flop X 302; flip-flop Y 303; status flip-flop S 304; flip-flop G 305; and data register R 306.

Counter C 301 is comprised of two four-bit binary counters 310 and 311. These counters are type 74913 as described on page S8-6 of the Texas Instruments TTL Catalog Supplement. The data source inputs to Counter C 301 a binary number through input pins C1 through C8, 312 through 319. The output of binary Counters 310 and 311 is coupled to NAND gate 312. The NAND gate 312 detects when the binary Counter C has counted to a value of zero. The NAND gate 312 is in turn coupled to an inverted amplifier 313. The output of amplifier 313 is a value of logical zero when the contents of Counter C is zero. The output of NAND gate 312 is also coupled to NOR gates 320 and 330 to enable the operation of these gates when the binary Counter C is not zero. The signal $\overline{G}$ 391 is used to trigger the decrement of the binary Counter C.

The data register R 306 is comprised of two S-8274 Signetics parallel-load shift register coupled by appropriate logic gates. The $\overline{LOAD}$ 341 from the data source is gated with the $\overline{G}$ signal at gate 343 and input to the register R 306 to control the bit-by-bit shifting of register R. The data signals input from the data source to be transferred to the data sink are noted in this embodiemnt by the symbols D1 through D16. These data bits are input into the logic elements 360, 382 and 384. The right-most bit of the data in the register R is transferred from the register's element 384 as the signal R 386 and also as the complement of R at the inverted amplifier 385, signal $\overline{R}$. NAND gates 381 and 382 and NOR gate 383 couple shift register 360 to shift register 384. The logical functioning of gates 381, 382 and 383 is such that when the initial state change command occurs, the data source bit D1 is shifted out of the right-most bit of shift register 384 and data source bit D10 is input into the left-most bit of shift register 384. This action occurs since the status signal S is a logical low value until the first state command signal changes S to a logical high (thus signal $\overline{S}$ is initially at a logical high value) and hence NAND gate 382 is activated to transfer data source bit D10 to NOR gate 383 or into the left-most bit input of shift register 383. After the first state change command, status signal S is at a logical high value and NAND gate 381 is activated to transfer the right-most bit of shift register 360 to the left-most bit position of shift register 384.

The flip-flop G 305 receives as an input the data source state change command signal T 354. This signal is amplified by inverting amplifiers 352 and 353 and is input to a D-type edge triggered flip-flop 351, of type 7474 as described in the Texas Instruments TTL Integrated Catalog, page 2–32. When the status flop S 346 is in a high logic condition, the leading edge of the amplified signal T causes a logical high control signal to be output from flip-flop 351 as signal G 354 and also causes a logical low control signal $\overline{G}$ 355. Signal G is in turn used to gate the changes of state for the other elements of box A.

The status flip-flop S 304 is composed of a D-type edge-triggered flip-flop, type 7474 (logic element 346 in FIG. 3), and appropriate gating logic for the trigger input to this flip-flop. The output from the inverted amplifier 313 $E_o$ is coupled to NAND gate 342 along with the output of the flip-flop G 354. The output of gate 342 is coupled to gate 344 along with the data source signal $\overline{LOAD}$ 341. As gate 344 is a NOR gate, its output falls low at the time when the data source is not loading the register R and when the binary Counter C is not zero and the control signal G is high. The output of gate 344 is in turn coupled to the inverted amplifier 345. Thus, the output of gate 345 rises high to set flip-flop S 346 to a high value when the binary Counter C is not zero, the data source is not loading the register R and action of the data dispatcher has been enabled by the data source.

Flip-flop X as shown in 302 is comprised of a complementing flip-flop 323 and the appropriate input and output gating logic. NOR gate 320 has as input signal $\overline{R}$ from amplifier 385 and the output signal from gate 312. Gate 302 thus outputs a high logic value when the binary Counter C is equal to a value of zero or when the right-most bit of register R is a one. Gate 320 is in turn coupled to NAND gate 321. The other input to gate 321 is the output signal from flip-flop G. Gate 321 thus outputs a low logic value when gate 320 is high and the state change command G is in a high logic state. When gate 321 outputs a low value, the flip-flop 323 is triggered to reverse its output from a one to a zero or a zero to a one. The complement value of flip-flop 323 is coupled to an inverting amplifier 324 which in turn is coupled to output pin 326, the signal X.

The flip-flop Y 303 is also composed of a complementing flip-flop 333 and the appropriate input and output gating logic. NOR gate 330 has as inputs the output from gate 312 and the output of the right-most bit of register R. Thus, the value of gates 330 becomes a logical high when the binary Counter C goes to zero or when the right-most bit of register R is a zero. Gate 330 is in turn coupled to NAND gate 331. The other input to gate 331 is the state change command signal G. Gate 331 thus outputs a low logical value when the state change command signal is high and either the binary Counter C has gone to zero or the right-most bit of register R has become a zero. As gate 331 is coupled to flip-flop 333, it follows that the output of gate 333 is complemented when the gate 331 falls to a low value. The complement output of flip-flop 333 is coupled to an inverting amplifier 334. The output of amplifier 334 is coupled to pin 336, the signal Y.

The NAND gates, NOR gates and also the complementing flip-flop are available from the integrated circuit manufacturers such as Texas Instruments, Signetics and National Semiconductor.

Having described box A 102 (ref. FIG. 1) box B will now be described. It is the function of box B to interpret changes of state of two externally supplied logical level signals, called A and B, into data, to assemble data in a shift register, to make assembled data available to the data sink, and to deliver to the data sink the count of the number of data bits that have been assembled. The two externally generated logic level signals A and B are the outputs of the signal receiver in this embodiment. There is no change in the functioning of box B if those are taken to be respectively the X and Y outputs of box A.

The specific interpretations of changes of signals A and B, as interpreted by box B, are:

1. If A changes from 0 to 1 or changes from 1 to zero and B does not change, a data one is to be put into the shift register, and one added to the data bit count.
2. If B changes from 0 to 1 or from 1 to 0 and A does not change, a data zero is to be put in the shift register, and one added to the data bit count.
3. If both A and B change simultaneously, the previously assembled data and the data bit count are to be delivered to the data sink. The data sink is to be informed of the availability of the data and the data bit count by box B setting a status flip-flop S to the zero state. Box B is to remain in a static condition until the data sink acknowledges receipt of the data and the data bit count by setting the status flip-flop S to one. The setting S to one by the data sink is to have the further effect of clearing the data bit count to zero.

Figure 4:
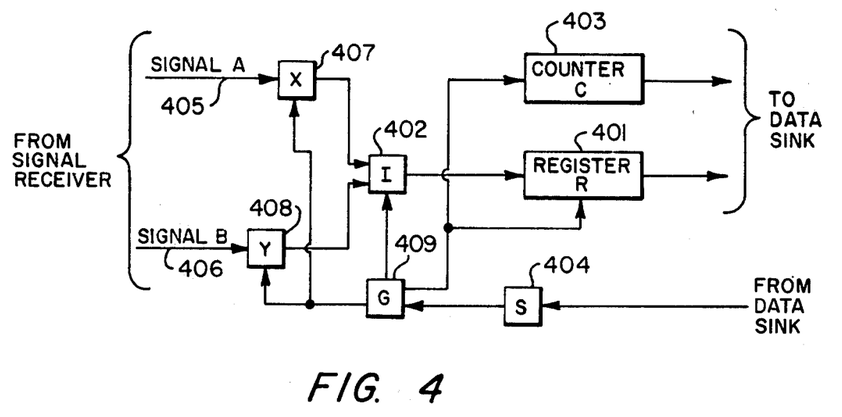
FIG. 4 is a block diagram of an embodiment of a data receptor, which will intervene between a signal receiver and the data sink, to transfer data serially in a rate-independent fashion.

One implementation of box B, as shown in FIG. 4, has within it:

1. A shift register R 401, in which data is assembled, and from which data is made available to the data sink.
2. A flip-flop I 402, which is set by internal logic of box B, and which serves as the input to R when the action "shift" is taken.
3. A counter C 403, the contents of which is increased by one each time the action "shift" is taken. The contents of C are accessible to the data sink simultaneously with the contents of R.
4. A status flip-flop S 404, which is set to zero by internal logic of box B, and set to one by the data sink. Additional internal logic of box B causes the contents of C to be cleared to zero when S is set to one. The data sink-supplied signal is designated $\overline{RSTB}$ below.
5. Two externally generated logic level signals, A 405 and B 406, which are the outputs of the communications signal receiver.
6. A pair of flip-flops X 407 and Y 408, whose state can be both sensed and set by box B logic. X and Y are much of the time set the same as A and B. When A and/or B change, X and Y are used to determine from what state the Y changed. It is convenient for monitoring, but not necessary for operation, to bring the outputs of X and Y outside the box.
7. A set of combination logic G 409 and G delayed, called G', which generate logic pulses when signal state changes in signals A or B are detected.

In more detail,

I,S,X,Y are each bistable elements (flip-flops). The set to one and set to zero conditions for each of them is stated infra.

R is a shift register. When the "shift" condition is fulfilled, the state of I is shifted into R. R has parallel read-out, accessible to the data sink.

C is a binary counter. One is added to the contents of C when the "count" condition, stated below is fulfilled. C is cleared to zero by a signal $\overline{RSTB}$, which is supplied by the data sink. C has parallel read-out, accessible to the data sink.

A,B are two logic level signals, supplied by the signal receiver.

G is a DC logic level, defined by $G = S(A\overline{X} + \overline{A}X + B\overline{Y} + \overline{B}Y)$.

G' is delayed. The amount of delay is large compared to logic gate transit time, but small compared to the rate at which A and B are expected to change state. A delay of 50 nanoseconds is a typical delay.

"Shift" is a transition, that of G becoming one.

Set I to one is a DC condition, $G' (A\overline{X} + \overline{A}X) (\overline{BY} + BY)$.

Set I to zero is a DC condition, $G' (AX + \overline{AX}) (B\overline{Y} + \overline{B}Y)$.

Set S to zero is a DC condition, $G' (A\overline{X} + \overline{A}X) (B\overline{Y} + \overline{B}Y)$.

Set S to one is an externally supplied signal $\overline{RSTB}$ that also clears C to zero.

Set X to one is a DC condition, G'A.
Set X to zero is a DC condition, G'$\overline{A}$.
Set Y to one is a DC condition, G'B.
Set Y to zero is a DC condition, G'$\overline{B}$.

"Count" is a transition, $G' (\overline{A}XBY + A\overline{X}BY + AB\overline{X}Y + ABX\overline{Y} + A\overline{BXY} + \overline{AB}X\overline{Y} + \overline{ABXY} + \overline{AB}XY)$ becoming one.

Figure 5:
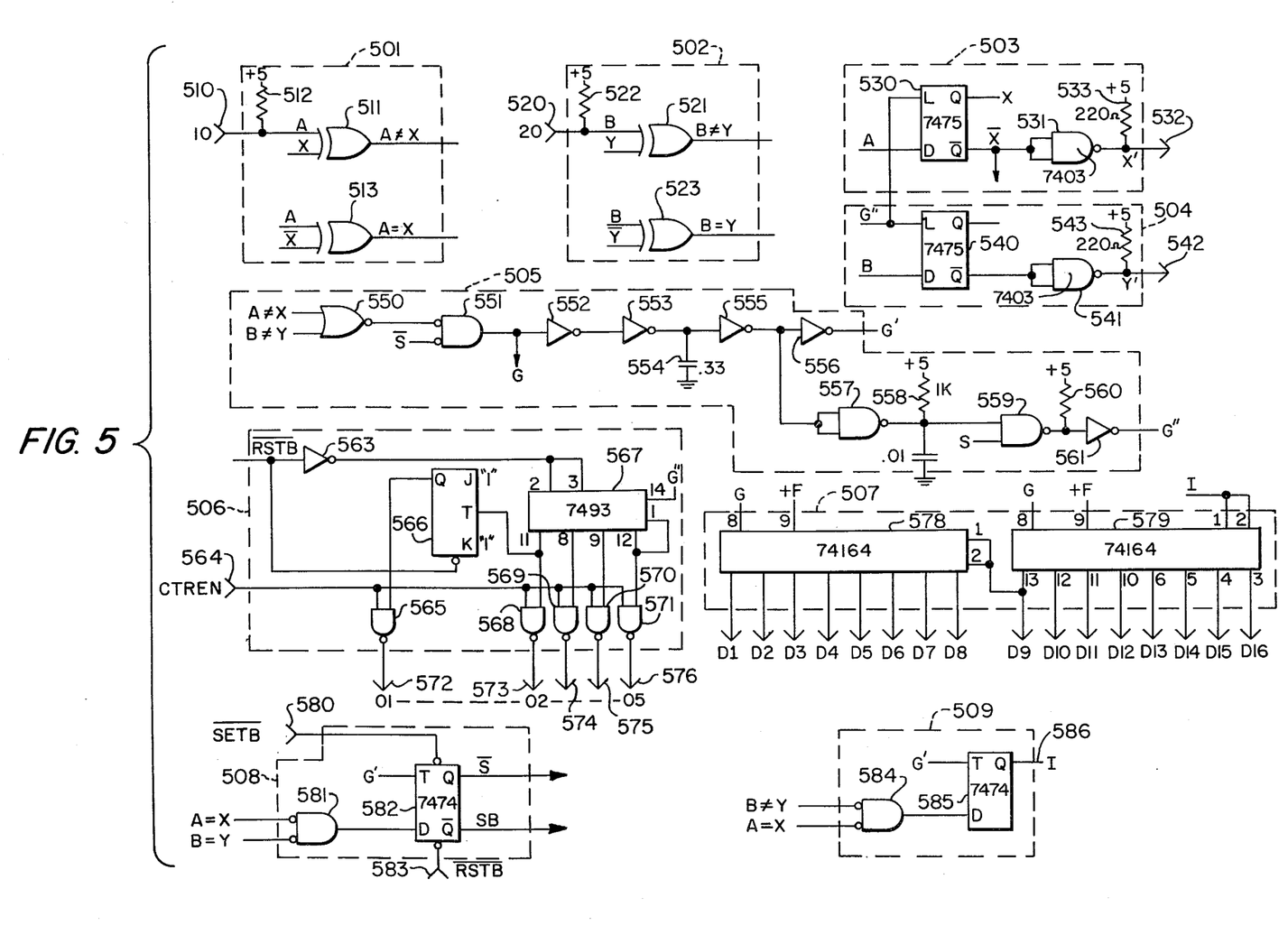
FIG. 5 is a logical diagram of an embodiment of a data receptor.

FIG. 5 shows a logical diagram of a B box. For ease of description, the logic circuitry has been divided into nine major sections as follows: The A signal logic 501; the B signal logic 502; X flip-flop 503; Y flip-flop 504; G and G' logic 505; Counter C 506; data register R 507; status flip-flop S 508; and flip-flop I 509.

The A signal logic 501 is comprised of the A input signal 510 and two exclusive-OR gates 511 and 513. The exclusive-OR gate 511 performs the exclusive-OR gate function from the signal A and the output signal X of flip-flop 530. The output signal of gate 511 is called the A ≠ X signal. The exclusive-OR gate 513 performs the exclusive-OR function on the signal A and the complement of the X flip-flop 503. The output of gate 513 is called the A = X signal.

The B signal logic 502 is comprised of the B signal 520 and two exclusive-OR gates 521 and 523. The exclusive-OR gate 521 performs exclusive-OR function on the B signal and the output of the Y flip-flop 540. The output of gate 521 is called the B ≠ Y signal. The exclusive-OR gate 523 performs the exclusive-OR function on the signal B and the complement of the Y flop 540. The output of gate 523 is called a B = Y signal.

The X flip-flop 503 is comprised of the flip-flop 530 and the appropriate output gating logic. The flip-flop is of the latching type flip-flop number 7475 which is manufactured by Texas Instruments and described in their catalog TTL Integrated Circuits Catalog, page 6-1. The input to the latch flop is the A signal and the latch is triggered by the signal G''. Thus, the output X of flop 530 maintains the value of the A signal as soon as the G'' signal rises. The output remains at the same level until the trigger input G'' has fallen to a low logic value and later risen to a high logic value. Upon the next occurrence of the G'' signal rising high, the output of the flip-flop will then take on the value of the input A signal. The complement output of flip-flop 530 is coupled to an open-collector output NAND gate 531. The Texas Instrument 7475 NAND gate as specified on page 2-10 of their TTL Integrated Circuits Catalog is an example of this type of gate. The output of gate 531 is coupled to the output pin 532 which constitutes the X' signal.

The Y flip-flop 504 is comprised of a latching-type flip-flop 540 and the appropriate output gating logic. The B signal is the input to be latched by the flip-flop 540 and the flip-flop is triggered by the signal G''. The latching flip-flop 540 thus takes on the value of the signal B when the flop is triggered by the signal G''. The complement output of the flip-flop 540 is coupled to the open-collector output NAND gate 541. The output of gate 541 is then coupled to the output pin 542, which is the signal Y'.

The flip-flop I 509 is comprised of a D-type edge-triggered flip-flop and the appropriate input gating logic. NAND gate 584 has as inputs the B = Y signal 523 and the A ≠ X 511. The output of gate 584 is coupled to the latch input of the flip-flop 585. Thus, the output of flop 585 takes on the value of the logic level output by gate 584 upon the rising edge of the signal G', which is the trigger for flop 585. It can be seen from this description of the I flip-flop logic that the output of flip-flop I will be a logical one when signal A changes its value from its previous value while signal B changes its value while signal A does not change its value from its previous value.

The status flip-flop S 508 is comprised of a D-type edge-triggered flip-flop 582 and the appropriate input gating logic. The trigger to change flip-flop 582 is the signal G'. NAND gate 581 has as input the A = X signal 513 and the B = Y signal 523. Thus, the value of gate 581 becomes a logical high state when the value of signal A and signal B are both not equal to their previous values. Gate 581 is coupled to flip-flop 582 providing the input signal for the flip-flop which is the value of the output of the flip-flop will take when triggered by G'. The value of flip-flop 582 may be set to zero by the SETB signal 580 being lowered to a logical low value. The value of the flip-flop S may be set to a logical high value by the lowering of the signal RSTB 583. The output of flop 582 is referred to as S̄, as a low value is used to signal the data sink that the data is ready in register R. The sink sets the S̄ signal to zero by the signal SETB being raised to high, thereby acknowledging receipt of the data and the data bit-count. The low condition of signal S̄ thus allows the logic to begin receiving further data. By raising the signal RSTB to a high value, the sink blocks the further reception of data.

The data register R is comprised of two 8-bit shift registers 578 and 579. These shift registers are of type 74164 in this embodiment. Data is loaded into register R at the right-most bit from flip-flop I 586. Shifting occurs from the signal G. The output from data register R is available on output pins 01 through 16 for transfer to the data sink. There is a direct coupling from the 8-bit shift register 578 to the 8-bit shift register 579.

The counter C 506 is comprised of a four-bit binary counter 567, a JK flip-flop 566, and the appropriate input and output gating logic. The binary counter C 567 is reset by the data sink signal RSTB which is input to the inverting amplifier 563 which is in turn coupled to the clear signal of binary counter 567. The binary counter is of type number 7493, as described in the Texas Instrument TTL Integrated Circuit Catalog on page 8-13. The J-K flip-flop 566 is coupled to the binary counter 567 to give a fifth bit of count. The binary counter increments upon the signal G''. The output of a five-bit count is obtained from NAND gates 565 through 571. The output from these gates is controlled by the data sink signal CTREN 564. The output of gates 565 to 571 is coupled to output pins 572 through 576.

The G and G' logic 505 is comprised of the appropriate gating logic to generate the signal G, G' and G''. The input to NOR gate 550 is the A ≠ X 511 and B ≠ Y signal 521. Thus, the output of gate 550 is a logical zero as long as signal A or signal B has changed from its previous value. Gate 550 is coupled to the NAND gate 551. The input to gate 551 besides gate 550 is the S signal. Thus, the output of gate 551 is a high value as long as the status flop S is set to logical one and either signal A or signal B has changed value. The output of gate 551 is signal G. The output of gate 551 is coupled to the inverting amplifier 552. The output of gate 552 is in turn coupled to the inverting amplifier 553, which is in turn coupled to the inverting amplifier 555. The output of gate 555 is coupled to the inverting amplifier 556. The output of gate 556 is the signal G'. The combination of inverted amplifiers 552 through 556 produces the delayed signal G' as described supra. The output of gate 555 is also coupled to gate 557 which is a NAND gate. The output of gate 557 is input NAND gate 559. The other input to gate 559 is the signal S. The output of gate 559 is input to the inverting amplifier 561, producing the signal G''. The signal G'' is in turn coupled to the latching flip-flops 530 and 540. Thus, signal G'' provides a delayed triggering pulse to these latched flip-flops.

Figure 6:
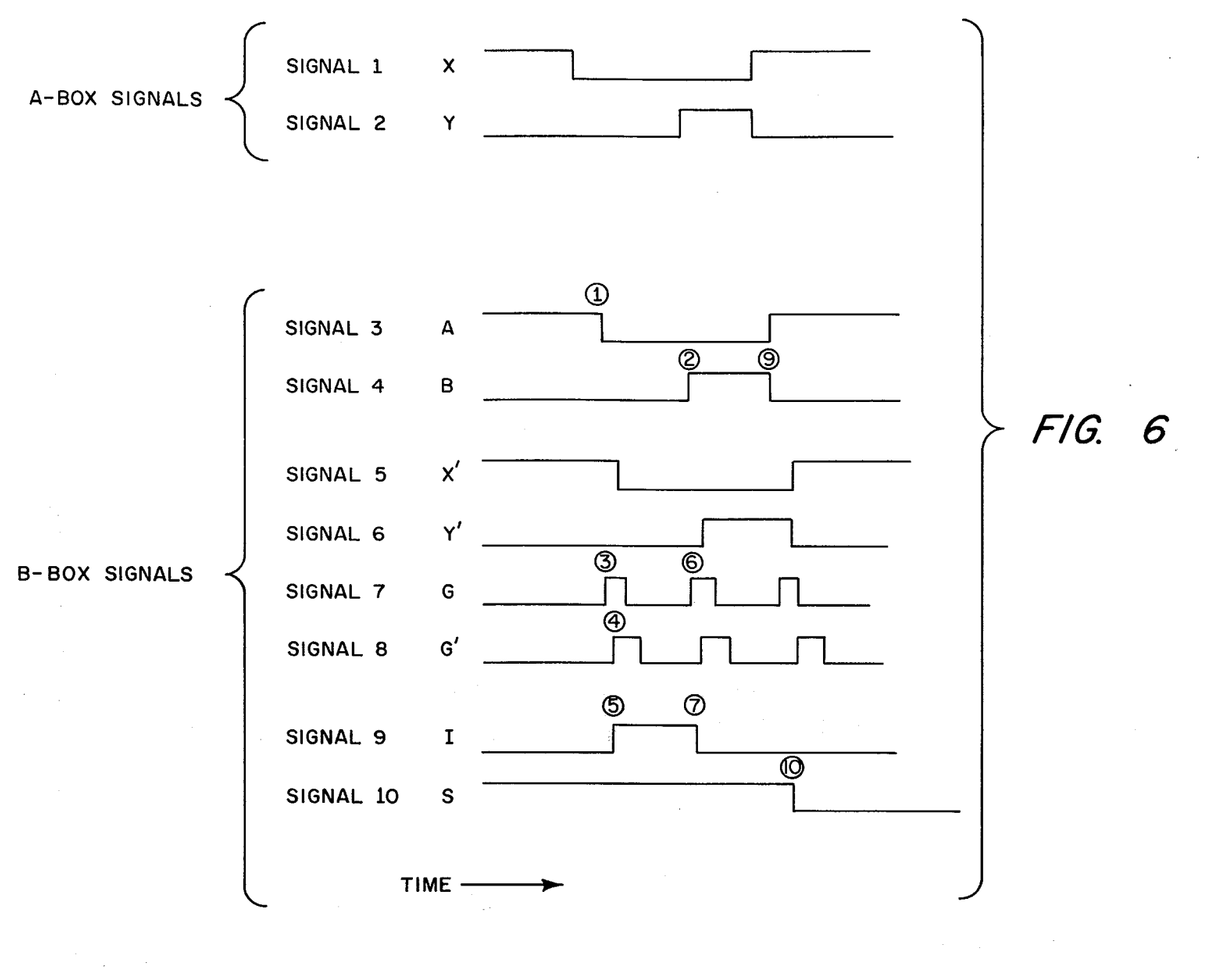
FIG. 6 is a representative timing chart for the transfer of a data from a data source to a data sink in a rate-independent fashion.

Referring to FIG. 6, a specific example is illustrated wherein two bits of data are transferred from a data source to a data sink through the intervention of a data dispatcher (box A) as shown in FIG. 3 and a data receptor (box B), as shown in FIG. 4. In the example shown in FIG. 6, a data value of one followed by a zero state value is transferred.

Signals number one and two shown in FIG. 6 represent the logic element output of correspondingly named elements in FIG. 3. The signals numbered 3 to 10 represent the logic element outputs of correspondingly named elements shown in FIG. 5. The circled numbers on FIG. 6 represent points in time where specific logic element actions take place. For example, time 1 and 2 show the logic levels in the B box (data receptor) corresponding to the output logic levels from the A box (data dispatcher) signals X and Y. The rising logic level of signal No. 7, G, shown at time event numbered 3, occurs as a consequence of the B box sensing a change of state in one of its input signals. Signal No. 8, G', follows signal No. 7 by a time delay as shown by time event number 4 for signal No. 8. In time event 5, signal No. 9, the output logic level of flip-flop I of the B box, rises to a logical one state indicating that a change in signal A was detected. This logical one is then shifted from flip-flop I into the right-most data register R. Looking at signal No. 7, it can be seen that a time unit 6, G again goes to a high logic value as a consequence of the change of signal B (signal No. 4). After signal G has been raised to a high value, signal No. 9, I, drops to a logical low value as shown in time event 7. The value of flip-flop I is then shifted into the right-most bit of data register R. Finally, at time event 9, signals No. 3 and No. 4 both change states and after signal No. 7, G, has been raised again to a high value, the flip-flop is lowered to a logical low value as shown in time event 10 to denote that the reception of data has been completed and that the data is now ready for the data sink's use.

Having shown and described one embodiment of the invention, those skilled in the art will realize that many variations, modifications can be made to produce the described invention and still be within the spirit and scope of the claim of invention.

What is claimed is:

1. An apparatus for serially conveying in a rate-independent fashion at least three different discrete units of information by changing the signal states of two bi-level signals, said apparatus comprising:
   means for changing the signal state of the first bi-level signal to represent a first discrete unit of information;
   means for changing the signal state of the second bi-level signal to represent a second discrete unit of information; and
   means for changing the signal states of both the first bi-level signal and the second bi-level signal to represent a third discrete unit of information.

2. The apparatus of claim 1 wherein said discrete units of information comprise a DATA ONE, a DATA ZERO, and an END OF DATA.

3. The apparatus of claim 1 further comprising a means for receiving said discrete units of information, said receiving means comprising means for interpreting each of said changes among said signalling states to correspond to said discrete units of information.

4. An apparatus for serially conveying in a rate-independent fashion at least three discrete units of information from a data source to a data sink by means of signal state changes among four signal states comprising:
   a data dispatcher which intervenes between said data source and said data sink to convey said discrete units of information to said data sink, said data dispatcher comprising:
   a binary counter means settable for determining the count of information bits to be transferred from said data source to said data sink;
   a shift register means loadable and with a facility for shifting bits of data bit-by-bit;
   at least two flip-flop means coupled to said shift register means for holding logic level outputs according to value of right-most bit of said shift register means;
   a status flip-flop means coupled to said binary counter means and said two flip-flop means for indicating to said data source that said information bits are being transferred to it; and
   a state-change command flip-flop means coupled to said shift register means, said two flip-flop means and to said status flip-flop means for allowing state changes to be conveyed to said signal transmitter for transmission to said data sink; and
   a data receptor which intervenes between said data sink and said data source to receive said discrete units of information for said data sink.

5. An apparatus as recited in claim 4 wherein said data dispatcher is coupled to a signal transmitter to transfer said signals states from said data dispatcher to said data sink.

6. An apparatus as recited in claim 4 wherein said data receptor is coupled to a signal receiver to receive said signal states from said data source for said data receptor.

7. An apparatus as recited in claim 4, said data receptor comprising:
   a. a binary counter means readable for indicating to said data sink the count of information bits received from said signal receiver;
   b. a shift register means readable for delivering said information bits received from said data source to said data sink;
   c. at least two first flip-flop means coupled to said signal receiver for holding logic level outputs according to value of signal levels received from said signal receiver;
   d. a second flip-flop means coupled to said shift register means and said two first flip-flop means for transferring information bits received from said data source to said shift register;
   e. logic circuit means coupled to said binary counter means, shift register means, first flip-flop means, and second flip-flop means for detecting the reception of a bit of information and allowing the transfer of an information bit received into said register; and
   f. a third flip-flop means coupled to fifth means and said data sink to indicate when reception of said bits of information is complete.

8. The apparatus of claim 4 wherein said data receptor comprises means for interpreting each of said changes among said signalling states to correspond to said discrete units of information.

9. A method of serially conveying in a rate-independent fashion at least three different discrete units of information by changing the signal states of two bi-level signals wherein said bi-level signals comprise signals A and B, said method comprising the steps of:
   changing only the state of signal A so as to represent said first discrete unit of information;
   changing only the state of signal B so as to represent said second discrete unit of information; and
   changing the states of both signal A and signal B so as to represent said third discrete unit of information.

10. The method of claim 9 wherein said three discrete units of information comprise a DATA ONE, a DATA ZERO, and an END OF DATA.

11. The method of claim 9 further comprising the step of:
   interpreting each change of the two bi-level signals as a discrete unit of information.

* * * * *